AUTOMATIC PROCESSOR FOR STACKED BEAM RADAR

Filed June 19, 1967 8 Sheets-Sheet 1

Norol T. Evans,
INVENTOR.
BY.
J K Haskell
ATTORNEY

| Present State | Next State 0 | 1 | 2 | 3 | 4 | 5 | 6 | 7 | 8 |
|---|---|---|---|---|---|---|---|---|---|
| 0 | .85 | .15 | 0 | 0 | 0 | 0 | 0 | 0 | 0 |
| 1 | .85 | 0 | .15 | 0 | 0 | 0 | 0 | 0 | 0 |
| 2 | 0 | .85 | 0 | .15 | 0 | 0 | 0 | 0 | 0 |
| 3 | 0 | 0 | .85 | 0 | .15 | 0 | 0 | 0 | 0 |
| 4 | 0 | 0 | 0 | .85 | 0 | .15 | 0 | 0 | 0 |
| 5 | 0 | 0 | 0 | 0 | .85 | 0 | .15 | 0 | 0 |
| 6 | 0 | 0 | 0 | 0 | 0 | .85 | 0 | .15 | 0 |
| 7 | 0 | 0 | 0 | 0 | 0 | 0 | .85 | 0 | .15 |
| 8 | 0 | 0 | 0 | 0 | 0 | 0 | 0 | .85 | |

Fig. 2

| Final State | Probability |
|---|---|
| 0 | $7.5 \times 10^{-1}$ |
| 1 | $1.5 \times 10^{-1}$ |
| 2 | $2.25 \times 10^{-2}$ |
| 3 | $3.4 \times 10^{-3}$ |
| 4 | $5.3 \times 10^{-4}$ |
| 5 | $1 \times 10^{-4}$ |
| 6 | $1.7 \times 10^{-5}$ |
| 7 | $5. \times 10^{-6}$ |
| 8 | $5.5 \times 10^{-7}$ |

Fig. 3.

| Code | Threshold Level | Probability of Occurrence |
|---|---|---|
| 000 | $x < 2.8$db | 0.85 |
| 001 | $2.8 \leq x \leq 5.8$db | $1.5 \times 10^{-1}$ |
| 010 | $5.8 \leq x \leq 7.6$db | $2.25 \times 10^{-2}$ |
| 011 | $7.6 \leq x \leq 9.0$db | $3.4 \times 10^{-3}$ |
| 100 | $x \geq 9.0$db | $5 \times 10^{-4}$ |

Fig. 4.

| Code | Action Bit | Counter Logic |
|---|---|---|
| 000 | 0 | −1 |
| 001 | 0 | +1 |
| 010 | 0 | +2 |
| 011 | 0 | +3 |
| 100 | 0 | +4 |
| 000 | 1 | +2 |
| 001 | 1 | +1 |
| 010 | 1 | 0 |
| 011 | 1 | −1 |
| 100 | 1 | -2 |

Fig. 5.

Oct. 15, 1968 N. T. EVANS 3,406,390

AUTOMATIC PROCESSOR FOR STACKED BEAM RADAR

Filed June 19, 1967 8 Sheets-Sheet 7

United States Patent Office 3,406,390

Patented Oct. 15, 1968

3,406,390

AUTOMATIC PROCESSOR FOR STACKED BEAM RADAR

Norol T. Evans, San Pedro, Calif., assignor to Hughes Aircraft Company, Culver City, Calif., a corporation of Delaware Filed June 19, 1967, Ser. No. 646,866
20 Claims. (Cl. 343—5)

ABSTRACT OF THE DISCLOSURE

An automatic processor in a stacked beam radar receiving system, in which video returns are quantized into a multilevel code consisting of a plurality of bits. The video returns from each range bin interval, quantized into the multibit code are utilized to update the count in a multibit counter, associated with each range bin as a function of the code's numerical value or amplitude. The count in each channel, as well as the counts in adjacent channels are utilized to generate leading trailing edge signals, used for target azimuth detection.

BACKGROUND OF THE INVENTION

(1) Field of the invention

This invention generally relates to a system for processing radar video returns and, more particularly, to an improved system for automatically processing multilevel video returns in a stacked beam radar receiving system.

(2) Description of the prior art

Since the primary purpose of a radar system is to detect and often track targets, one of the primary functions of a radar receiving system is to separate signals from meaningful or valid targets from meaningless signals. This function is generally performed by various signal processing techniques. In some, more advanced radar systems, beam stacking is employed to increase the accuracy with which signals from meaningful targets are separated for meaningless signals. In such a system, signals simultaneously received by a plurality of receivers are developed into video returns. These are then processed to determine whether they represent returns from a meaningful target. Since quite often, computers are employed to perform the processing, the video returns are first digitized in order to adapt them for computer use.

In a prior art system, a stacked beam radar arrangement is employed in which a plurality of receivers receive signals, simultaneously. These signals are developed into video returns, which are simultaneously processed. Briefly, the video returns from each range bin, developed in each receiver, are quantized and digitized into a 1 bit binary number. The bit is a "1" when the peak amplitude of video returns from a range bin exceed a selected threshold level and "0" when the peak amplitude is below the threshold level. The 1 bit binary outputs from each receiver are successively supplied to a separate counter whose count is incremented by the "1's," and decremented by the "0's." The counts in the various counters are utilized to automatically determine the azimuth of meaningful targets.

Such a prior art system has been found to provide advantages over other radar systems in that the digitizing of the video returns simplifies the processing circuitry. Also, by combining the counts in the various counters, the advantages flowing from beam stacking are realized. However, from signal analysis theory and practical processing, it has been concluded that the prior art system's advantages are unnecessarily limited. This is due to the principle used to digitize the video returns, which doe not take full advantage of the content of the video returns.

It is submitted that the relative amplitudes of video returns contain useful information which is lost when all returns above the threshold level, regardless of absolute amplitudes, are digitized to the same level, i.e. as "1." Thus, a need exists for an improved processing system for stacked beam radar, in which full advantage is taken of the information contained in the video returns.

OBJECTS AND SUMMARY OF THE INVENTION

It is a primary object of the present invention to provide an improved radar receiver processing system.

Another object is the provision of an improved stacked beam radar system in which full advantage is taken of the information contained in the video returns.

A further object of this invention is to provide an improved stacked beam radar system, in which the video returns are processed so that information, contained in their relative amplitudes, is utilized.

Still a further object of this invention is the provision of a new processor of video returns in a radar receiving system, in which video returns are simultaneously developed from a plurality of beams which are simultaneously received.

These and other objects of the invention are achieved by providing a novel processor in a stacked beam radar receiving system. In this processor the video returns from each range bin, developed in each receiver are quantized into a multibit code, whose numerical value or amplitude is strictly a function of the peak amplitude of the video returns with respect to a threshold level. The multibit code from each receiver is then supplied to a binary counter, through logic circuits to change the count as a function of the numerical value of the multibit code. Thus, a larger code, indicating a larger peak of video returns augments the counter by a larger number than a smaller multibit code, representing a smaller peak of video returns. The counts in various related counters are used to sense the leading and trailing edges of target patterns which are used to determine target azimuth.

The novel features that are considered characteristic of this invention are set forth with particularly in the appended claims. The invention will best be understood from the following description when read in connection with the accompanying drawings.

BRIEF DECRIPTION OF THE DRAWINGS

FIGURES 2 through 5 are tables useful in explaining one embodiment of the present invention;

Figure 6:
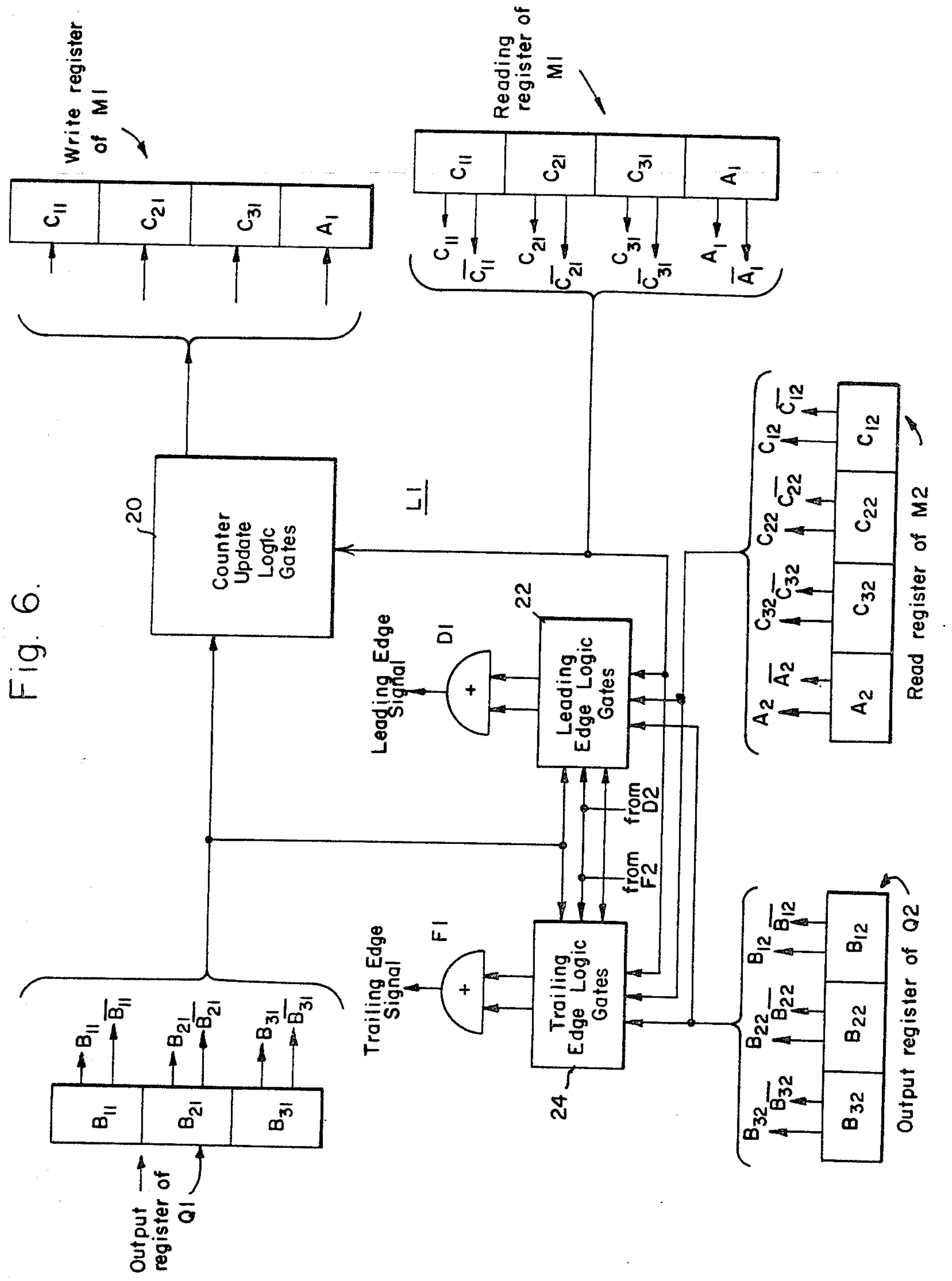
FIGURE 6 is an expanded block diagram of a control logic shown in FIGURE 1.
Figure 10:
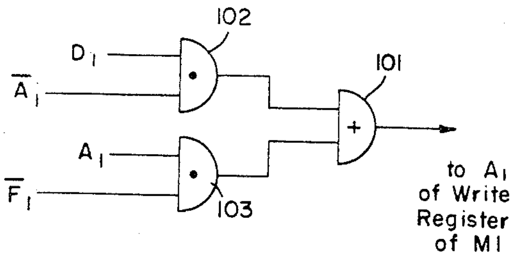
Figure 11:
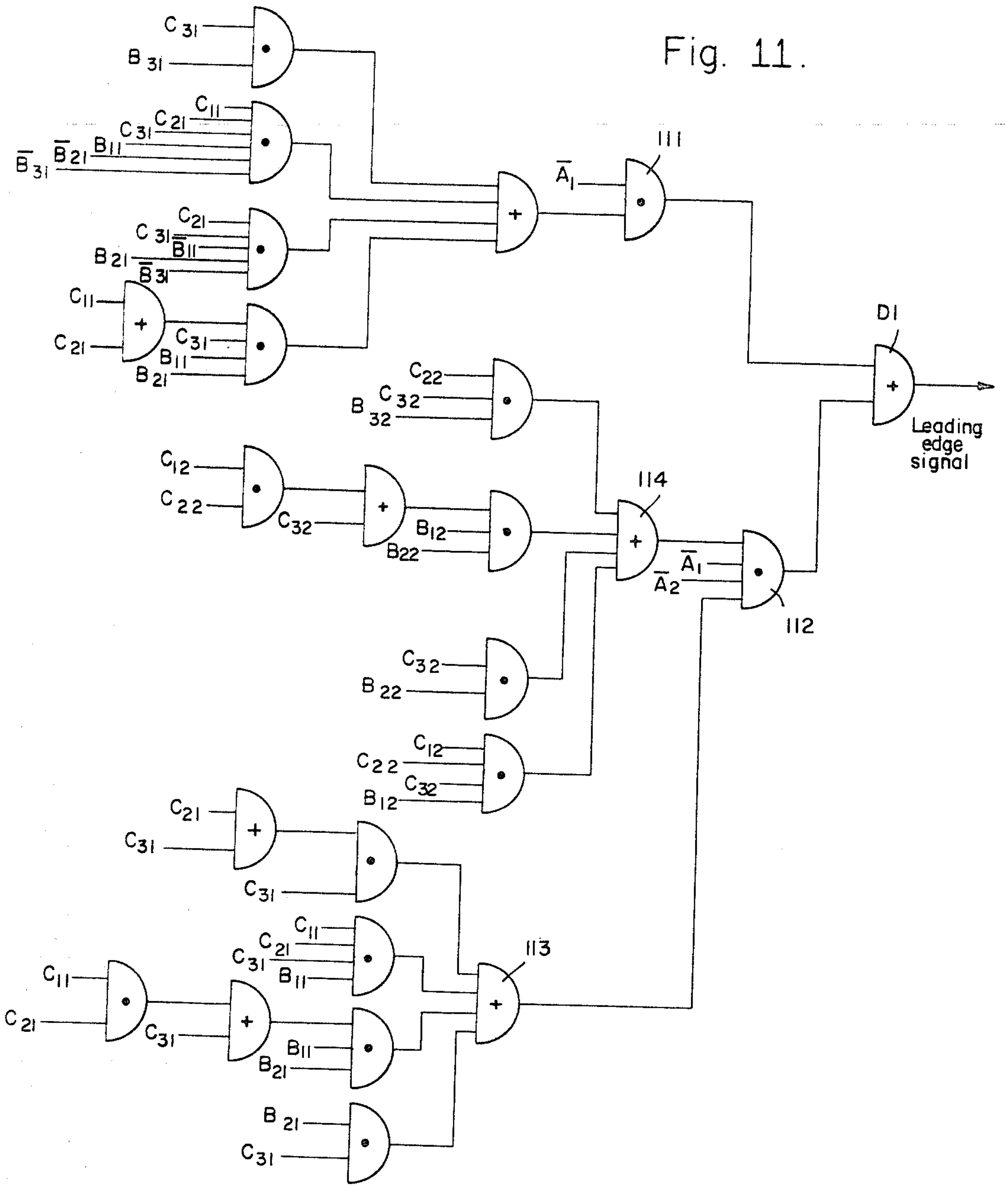
Figure 12:
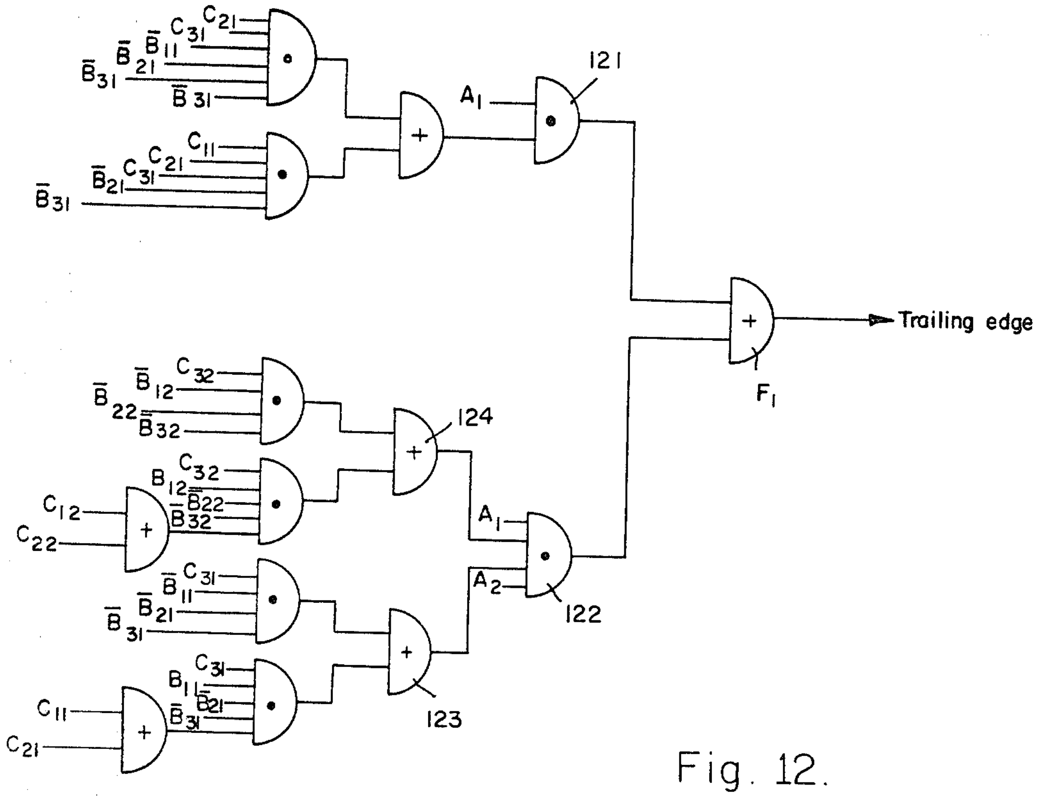

FIGURES 7 through 10 are expanded block diagrams of counter update logic gates represented in FIGURE 6 by block 20; and FIGURES 11 and 12 are expanded block diagrams of leading and trailing edge logic gates, shown in FIGURE 6 by blocks 22 and 24 respectively.

DESCRIPTION OF THE PREFERRED EMBODIMENTS

Figure 1:
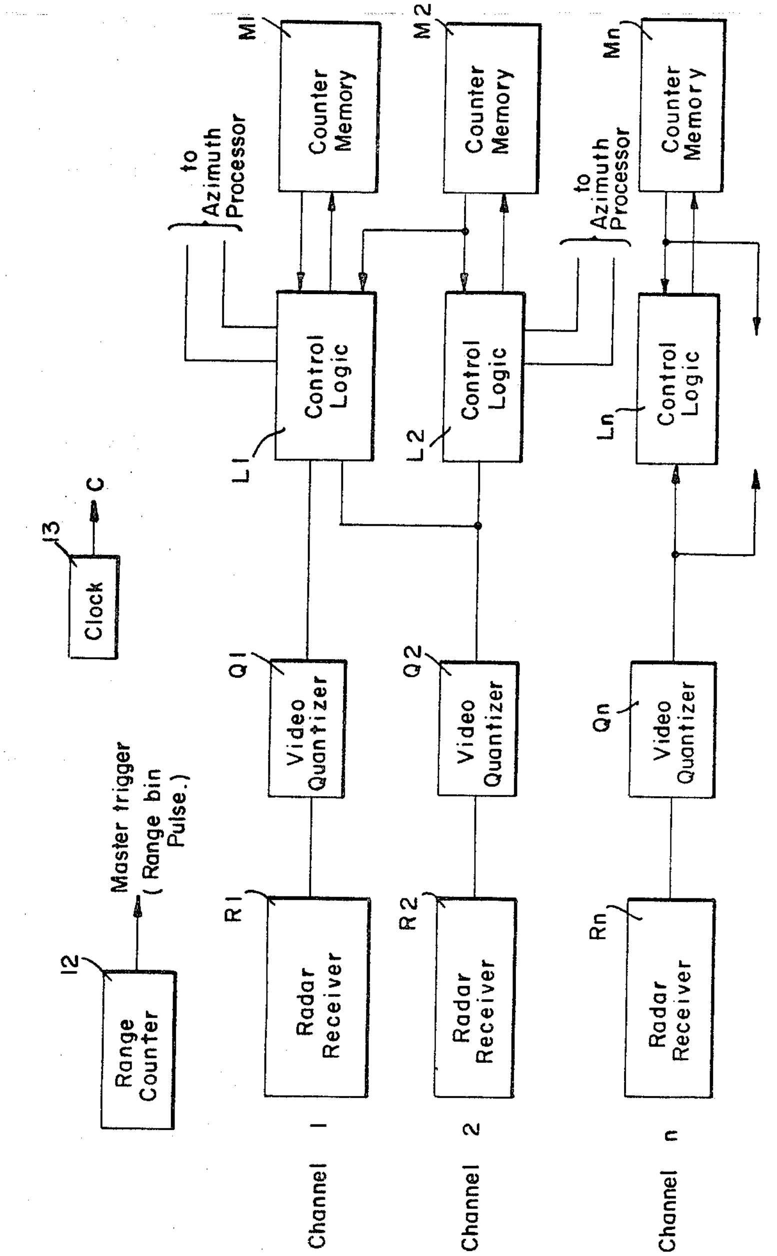
FIGURE 1 is an overall block diagram of the present invention.

Reference is now made to FIGURE 1 which is a simplified diagram of one exemplary embodiment of the invention. In the figure a plurality of radar receivers R1, R2 through R*n* are shown with their outputs connected to respective video quantizer Q1, Q2 through Q*n*. The receivers R, quantizers Q and other circuitry to be described hereafter defining channel 1, 2 through *n* are assumed to be provided with master trigger signals from a master range counter 12. Counter 12, for example, may be a Mod 1024 counter, defining 1024 range bin intervals in space from which reflected energy may be received by the various receivers. A clock 13 is also assumed to be incorporated in the system. Clock 13 applies clock pulses *c* to the various logic elements in the system to control them to perform their respective logic operations only at the clock pulse durations.

In operation, in a stacked beam radar system a plurality of pulses of energy, such as *n* pulses are transmitted simultaneously, with the energy returned from each pulse being received by a different one of the *n* receivers. The transmitting circuitry is deleted from FIGURE 1, since the present invention relates to the processor in the receiving portion of the stacked beam radar system. Each of the receivers receives the energy from each range bin and develops video returns, whose amplitudes vary as a function of the received signal energy. The output of each receiver is supplied to its corresponding video quantizer Q, wherein detectors are employed to provide a multibit output code whose numerical value or amplitude represents the relative value of the peak of the video return with respect to a preselected threshold level. The multibit output codes may be thought of as video amplitude codes, which will be described hereafter in detail.

The video amplitude codes successively generated by each quantizer are supplied to a respective control logic, designated L1, L2 through L*n*, which supplies signals to and receives signals from a respective counter memory M1, M2 through M*n*. Briefly, each memory, such as M1, contains a word for each range bin. Part of the word represents a multibit counter, while the rest is an action bit used as part of the counter. During each range bin, as Q1 develops and provides a video amplitude code indicating the peak amplitude of the video returns from the range bin, the counter in M1 associated with the particular range bin is read into L1. Thus, L1 receives the video amplitude code and the counter content. Control logic L1 includes logic circuitry to vary or update the count of the counter as a function of the video amplitude code. This differs from the prior art processing system previously referred to in which the quantizer provides a 1 bit code and the counter is either incremented by a fixed value or decremented by a fixed value.

When the count in the counter is to be augmented above a certain value, its action bit is set, the counter is reset and an azimuth leading edge signal is supplied by unit L1. Thereafter, a new logic relationship is employed until the count again reaches a selected value, at which time an azimuth trailing edge signal is supplied by unit L1. The leading and trailing edge signals are supplied to an azimuth processor (not shown) which divides the azimuth locations of the antenna (not shown) when the two edge signals are produced to derive the azimuth of the target center. The leading and trailing edge signals may be produced only as a function of the count in a counter in M1. However, in a stacked beam radar system, it is preferable to provide such signals as a function of the count from the same range bin from related adjacent beams. Thus, in FIGURE 1, the output of memory M2 is also shown connected to L1, so that the logic therein is operated to provide the edge signals as a function of counts in two related channels. It should be appreciated that other channels' relationships may be employed.

The foregoing descrcibed circuitry for each channel may be summarized as consisting of an up-down counter which is provided for each range bin. The counters count up on hits and down on misses until a leading edge signal is detected. Once detected, the count is modified until a trailing edge signal is detected. The target azimuth position is then computed to be half way between the leading and trailing edge antenna azimuth positions. Since targets can also appear between two adjacent elevation beams, the counts in two adjacent channels, such as 1 and 2, are combined for detection. The basic theory underlying the present invention and the reasons for selecting certain parameters to be described hereafter in conjunction with an exemplary embodiment of the invention, may be best explained by considering the following.

An up-down counter may be thought of as one operating as a Markov processor in which a correlation is employed between the detection of targets from scan to scan. Such a process is known in the art. For example, one explanation of the process may be found in "Introduction to Radar Systems," by Merril I. Skolnik, published by McGraw Hill Book Company in 1962, p. 55. With a hit probability of 0.15 and a miss probability selected as 0.85, the probability that the count in the counter will go from a given or present state to some other state where the counter counts up by 1 for a hit, and down by 1 for a miss is best exemplified in the table charted in FIGURE 2.

The table of FIGURE 2 can be considered a probability matrix of a Markov process. If the matrix is multiplied by itself a large number of times, a stable state of the matrix will be determined. This stable state has the following properties:

(1) The sum of the entries in each row equals 1.

(2) All entries in a particular column are equal.

As a result, the stable state of this matrix gives the likelihood of the counter being in a particular state after it has been running for a long time. The table diagrammed in FIGURE 3 shows the results of this calculation. From FIGURE 3 it is seen that the probability that the counter is in a final state of zero (0) is $7.5\times10^{-1}$. On the other hand, a probability of $5.5\times10^{-7}$ exists that the counter's final state will be eight (8).

It has been found that a threshold level of 2.8 db above RMS noise yields an expected false alarm rate due to noise of $1.5\times10^{-1}$. It can also be observed from FIGURE 3, that the probability of being in count $i$ is approximately equal to $(1.5\times10^{-1})^i$, when $i$ is equal or greater than 1. It is this relationship which has been used to generate values for using the multibit code from the quantizer in each channel to control the augmenting and decrementing of the counters in the memory associated therewith.

In accordance with these rules, a video code representing peak video which is twice as large as the RMS noise should correspond to the same false alarm rate that two video codes representing peak video equalling RMS noise in sequence generate. To accomplish such a relationship, in one embodiment of this invention, the peak video of the returns in each range bin are quantized into 3-bit codes as diagrammed in the table of FIGURE 4. Therein, X represents the peak video returns.

As seen from FIGURE 4, when X is less than 2.8 db above the selected threshold level, assumed to represent RMS noise, the output of a quantizer is a 3-bit code of 000, while its amplitude is one, i.e., 001 when the peak video X is between 2.8 db and 5.8 db above RMS noise. It is these 3-bit codes which are used in the present invention to agument the count of the counter, used for azimuth edge detection.

Assuming that a threshold count of 8 is selected for leading edge detection of targets, a rule for detecting trailing edges must be selected that gives good symmetry and thus accurate azimuth beam splitting. In the present invention, it is assumed that the 3-bit video codes from the range bins (FIGURE 4) are supplied to 3-bit counters, each associated with an additional bit representing an action bit. When the leading edge of a target is detected, the action bit which was initially in a zero (0) or reset state is set to a "1." The counter logic is then modified and the counter reset to all zeroes. When the threshold count of 8 is again reached, a trailing edge is declared. The target azimuth is then computed to be halfway between the leading and trailing edge azimuth positions.

The logic used to modify the count in each 3-bit counter and its associated action bit as a function of the different possible 3-bit video codes is best summarized in the table of FIGURE 5. The first five lines represent the logic used to detect the leading edge, while the last five lines represent the logic for detecting the trailing edge. As is clearly seen from the second through the fifth lines, the counter is not merely augmented by one, each time the peak video exceeds the RMS noise, regardless by how much, as is done in the prior art. Rather, the counter may be augmented by anywhere from one to four, depending on the amplitude or numerical value of the 3-bit code which in turn depends on the actual amplitude of the peak video returns above the RMS noise. Such a technique makes much greater use of the information contained in the video returns since it utilizes the relative amplitudes of the video returns, and therefore improves the accuracy of target detection.

The circuitry necessary to perform the logic operation summarized in FIGURE 5 is included in each of the control logic units L, for each of the different reception channels. The circuitry such as L1 may better be explained in conjunction with FIGURE 6. Therein, the central logic L1 is shown including counter update logic gates, represented by block 20 and two output gates designated $D_1$ and $F_1$. The latter gates, when true, provide the leading edge signal and trailing edge signal respectively. In addition in FIGURE 6, $C_{11}$, $C_{21}$ and $C_{31}$ represent the three bits of the counter which are read out through an appropriate read register from memory M1. The first subscripts 1, 2 and 3 represent the degree of significance, 3 being the most significant digit and the second subscript 1 indicates channel 1. The letter $A_1$ represents the action bit, while $B_{11}$, $B_{21}$ and $B_{31}$ represent the 3 bits of the 3-bit video code from quantizer Q1. Here again, the first subscripts 1, 2 and 3 represent the degree of significance and the last subscripts 1 represent channel 1.

In operation, during each range bin interval, the three bits $B_{11}$, $B_{21}$ and $B_{31}$ are received from quantizer Q1. At the same time, bits $C_{11}$, $C_{21}$, $C_{31}$ and $A_1$ for the particular range bin interval are read out from memory M1. The counter update logic gates 20 perform the necessary updating logic as per the operation outlined in FIGURE 5. Also, gates $D_1$ and $F_1$ are associated with 22 and 24 respectively to determine the detection of a leading or trailing edge. As herebefore indicated, since targets can appear between two adjacent elevation beams, detection is also based on the counts in two adjacent channels. This is shown in FIGURE 1 by supplying control logic L1 with signals from Q2 and M2. In FIGURE 6 these signals are designated as $C_{12}$, $C_{22}$, $C_{32}$ and $A_2$, and their complements where $C_{12}$, $C_{22}$ and $C_{32}$ represent the bits from the read register of M2 for the counter of the same range bin interval and $A_2$, the action bit associated with the three counter bits in channel 2. $B_{21}$, $B_{22}$ and $B_{32}$ and their complements represent the 3-bit video code from Q2.

The logic equations for updating the three bit counter represented by $C_{11}$, $C_{21}$ and $C_{31}$ are as follows, wherein the bar represents the conventional complementary symbol. The terms on the left hand sides of the various equations represent the states of three bits of a conventional write register used to write into memory the three bits after proper updating, while the terms on the right of the various equations represent read out binary signals or bits.

$$\text{Set } C_{11}=\bar{A}_1\bar{D}_1[\bar{C}_{11}B_{11}+C_{11}\bar{B}_{11}(B_{21}+B_{31})] +A_1\bar{F}_1[C_{11}(\bar{B}_{31}\bar{B}_{21}\bar{B}_{11}+\bar{B}_{31}B_{21}B_{11} +C_{21}B_{31})+\bar{C}_{11}\bar{B}_{31}\bar{B}_{21}B_{11}+\bar{B}_{31}B_{21}B_{11} (C_{21}+C_{31})] \quad (1)$$

$$\text{Reset } C_{11}=\overline{\text{Set}\ \bar{C}_{21}} \quad (2)$$

$$\text{Set } C_{21}=\bar{A}_1\bar{D}_1[\bar{B}_{31}\bar{B}_{21}\bar{B}_{11}(C_{21}C_{11}+C_{31}\bar{C}_{21}\bar{C}_{11}) +\bar{B}_{31}\bar{B}_{21}B_{11}(\bar{C}_{21}C_{11}+C_{21}\bar{C}_{11}) +\bar{B}_{31}B_{21}\bar{B}_{11}(\bar{C}_{21}\bar{C}_{11}+\bar{C}_{21}C_{11})+\bar{B}_{31}B_{21}B_{11} (\bar{C}_{21}\bar{C}_{11}+C_{21}+C_{11}) +B_{31}\bar{C}_{31}C_{21}]+A_1\bar{F}_1[\bar{B}_{31}\bar{B}_{21}\bar{B}_{11}\bar{C}_{21} +\bar{B}_{31}\bar{B}_{21}B_{11}(\bar{C}_{21}C_{11}+C_{21}\bar{C}_{11}) +\bar{B}_{31}B_{21}\bar{B}_{11}C_{21}+\bar{B}_{31}B_{21}B_{11}(C_{21}C_{11} +C_{31}\bar{C}_{21}\bar{C}_{11})+B_{31}C_{31}\bar{C}_{21}] \quad (3)$$

$$\text{Reset } C_{21}=\overline{\text{Set}\ \bar{C}_{21}} \quad (4)$$

$$\text{Set } C_{31}=\bar{A}_1\bar{D}_1[\bar{B}_{31}\bar{B}_{21}\bar{B}_{11}(C_{31}C_{11}+C_{31}C_{21}) +\bar{B}_{31}\bar{B}_{21}\bar{B}_{11}(C_{21}C_{11}+C_{31}) +\bar{B}_{31}B_{21}\bar{B}_{11}C_{21}+\bar{B}_{31}B_{21}B_{11}C_{11} +B_{31}]+A_1\bar{F}_1[\bar{B}_{31}\bar{B}_{21}\bar{B}_{11}C_{21} +\bar{B}_{31}\bar{B}_{21}B_{11}(C_{31}+C_{21}C_{11}) +\bar{B}_{31}B_{21}\bar{B}_{11}C_{31}+\bar{B}_{31}B_{21}B_{11} (C_{31}C_{21}+C_{31}C_{11})+B_{31}C_{31}C_{21}] \quad (5)$$

$$\text{Reset } C_{31}=\overline{\text{Set}\ \bar{C}_{31}} \quad (6)$$

In addition to updating the three counter bits, the action bit has to be updated. The updating logic is best expressed by the following expression, in which the lefthand term represents $A_1$ in the write register and the terms on the righthand side, the $A_1$ bit in the read register and signals from gates $D_1$ and $F_1$.

$$\text{Set } A_1=D_1\bar{A}_1+A_1\bar{F}_1 \quad (7)$$

In the present embodiment leading and trailing edges are assumed to be detected when the count in one counter reaches a threshold count of eight or when a count of six is reached in two adjacent counters. To accomplish such detection, output gates $D_1$ and $F_1$ are associated with leading edge logic gates 22 and trailing edge logic gates 24, respectively. Their logic operation is best expressed by the following equations.

$$D_1=\bar{A}_1[\bar{B}_{31}\bar{B}_{21}B_{11}C_{31}C_{21}C_{11}+\bar{B}_{31}B_{21}\bar{B}_{11}C_{31}C_{21} +B_{21}B_{11}C_{31}(C_{21}+C_{11})+B_{31}C_{31}]+\bar{A}_1\bar{A}_2 [[B_{31}(C_{31}C_{21})+B_{21}B_{11}(C_{31}+C_{21}C_{11}) +B_{21}B_{31}+B_{11}C_{31}(C_{21}C_{11})][B_{32}(C_{32}C_{22}) +B_{22}B_{12}(C_{32}+C_{22}C_{12})+B_{22}C_{32}+B_{12}C_{32} (C_{22}C_{12})]] \quad (8)$$

$$F_1=A_1[\bar{B}_{31}\bar{B}_{21}\bar{B}_{11}C_{31}C_{21}+\bar{B}_{31}\bar{B}_{21}B_{11}C_{31}C_{21}C_{11}] +A_1A_2[\bar{B}_{31}\bar{B}_{21}\bar{B}_{11}C_{31}+\bar{B}_{31}\bar{B}_{21}B_{11}C_{31} (C_{21}+C_{11})][\bar{B}_{32}\bar{B}_{22}\bar{B}_{12}C_{32}+\bar{B}_{32}\bar{B}_{22}\bar{B}_{12}C_{32} (C_{22}+C_{12})] \quad (9)$$

Figure 7:
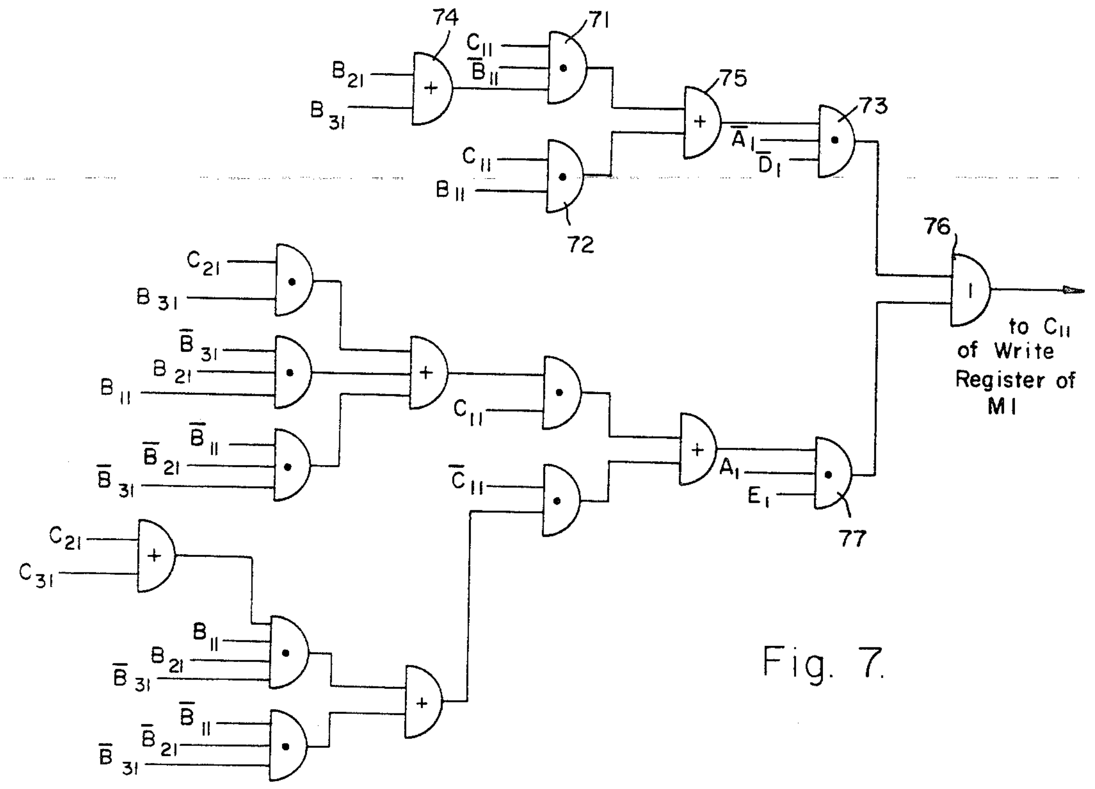
Figure 8:
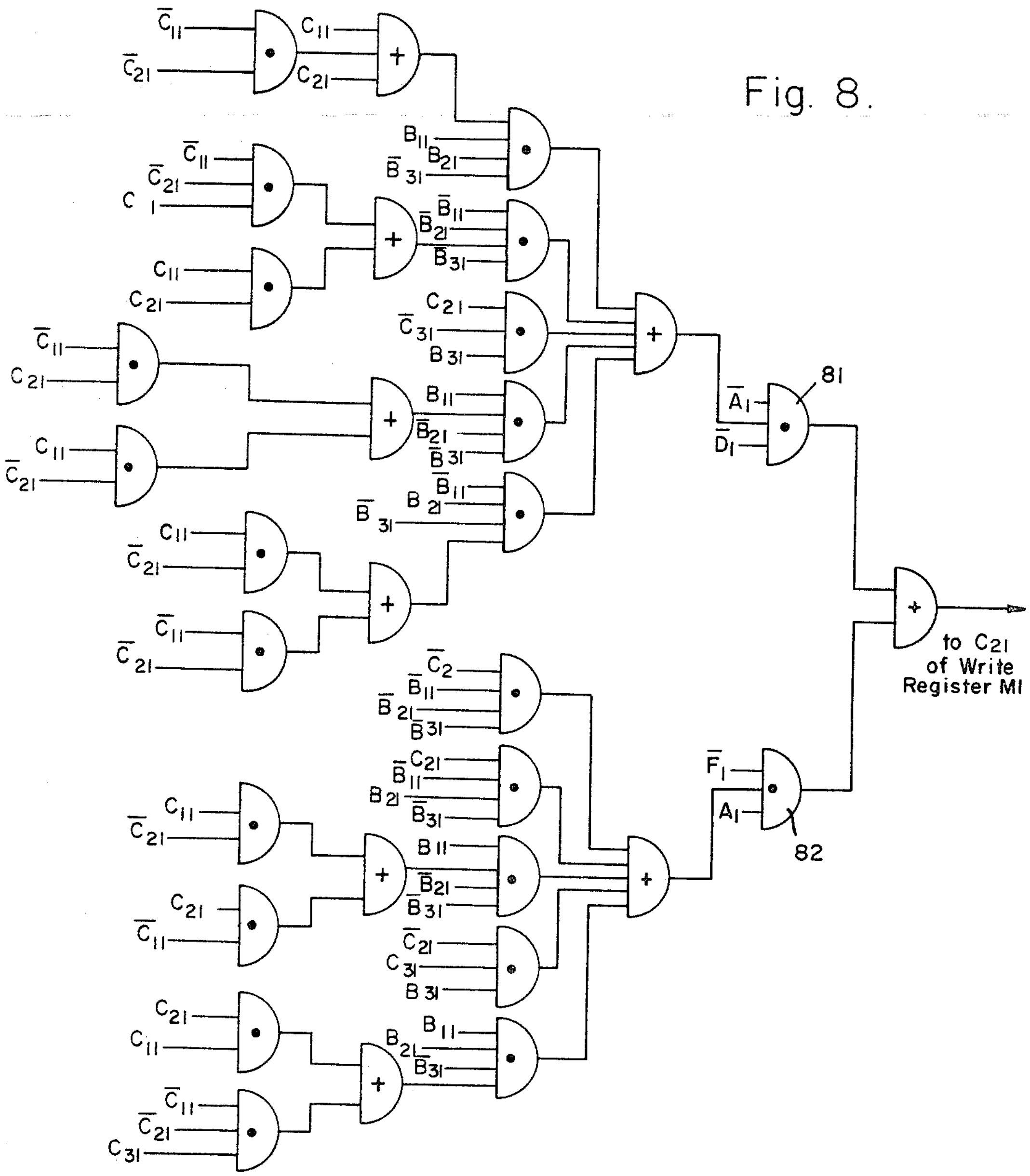
Figure 9:
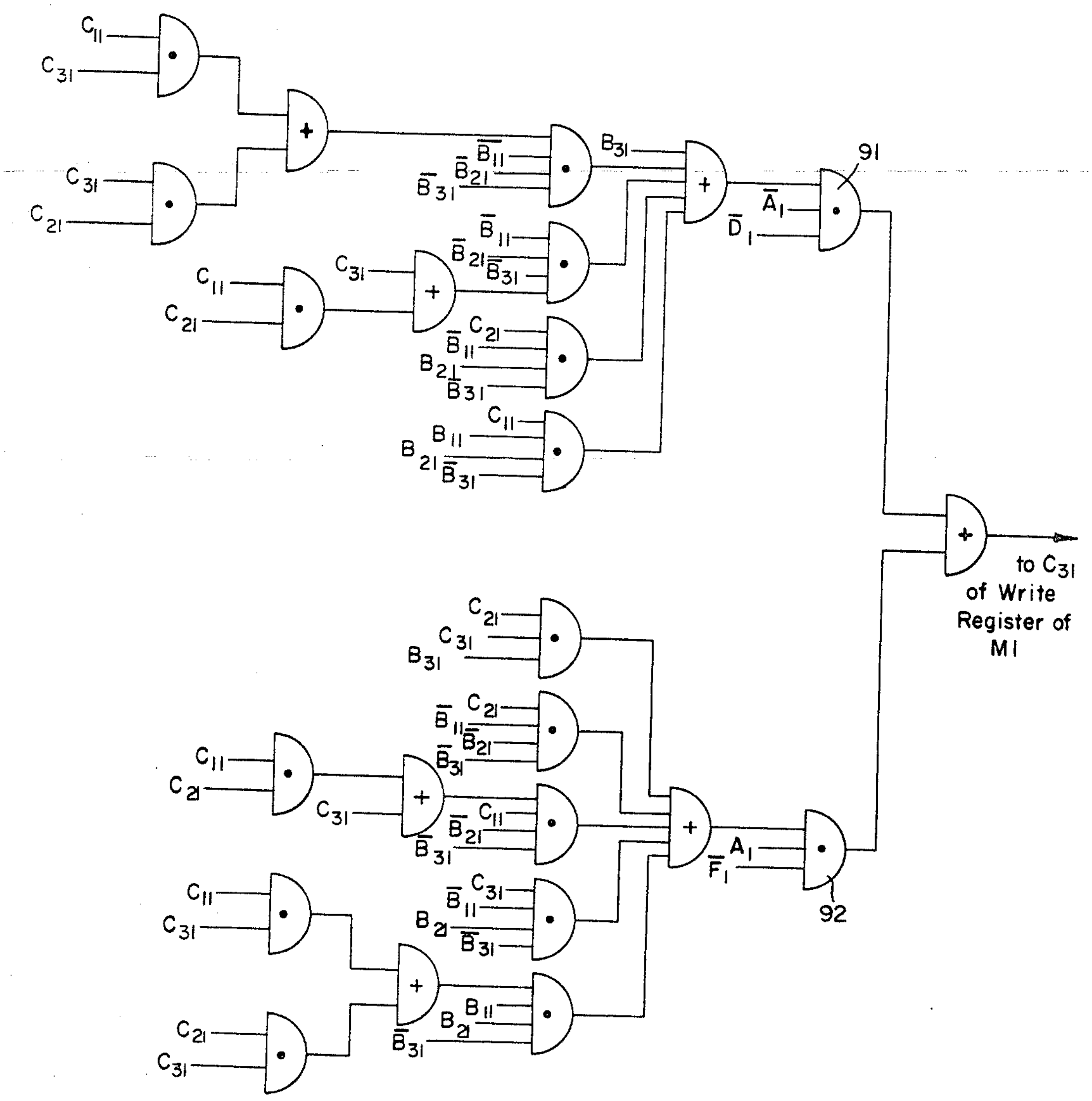

The basic concepts of the invention of updating a counter for each range bin interval in each channel as a function of multibit video codes and producing leading and trailing edge signals as a function of the count in the counter in one channel or in two adjacent channels may further be explained in conjunction with figures in which the various logic gates are schematically detailed. Such details are shown in FIGURES 7, 8 and 9 in which the counter update logic gates 20 are shown. FIGURE 7 is a schematic diagram of the gates for updating $C_{11}$, FIGURE 8 of gates for updating $C_{21}$ and FIGURE 9 of gates for updating $C_{31}$, in accordance with the logic operations, summarized in FIGURE 5. These logic operations are expressed in Equations 1 through 6.

FIGURE 10 is a schematic diagram for updating the action bit $A_1$ as a function of the detection of the leading edge which occurs when gate's $D_1$ output is true, assumed to be a "1" state. FIGURES 11 and 12 respectively are schematic diagrams of the leading edge logic gates 22 with gate $D_1$ and trailing edge logic gates 24 with $F_1$. These gates are utilized to produce the leading and trailing edge signals used for target azimuth determination. These logic operations are expressed in Equations 7, 8 and 9.

In explaining the logic circuitry of FIGURES 7 through 10, it should be recalled that the gates perform the logic charted in FIGURE 5. That is, the leading edge signal is derived when the action bit is a zero or $\bar{A}_1$ is true, and the 3-bit video code plus the count in bits $C_{11}$, $C_{21}$ and $C_{31}$ would exceed the threshold count of eight (8). Also, once the leading edge is detected $A_1$ becomes true and a new logic relationship is performed until the threshold count of eight is reached once more. At that time $F_1$ is set to provide a true output, indicating the trailing edge signal.

Briefly, the setting of the least significant bit $C_{11}$ expressed by Equation 1 is performed by the gates in FIGURE 7. The setting of the bit while the leading edge is to be detected is controlled by AND gates 71, 72 and 73 and OR gates 74 and 75. Prior to detecting the leading edge, the action bit $A_1$ is a zero, i.e. $\overline{A}_1$ is true and $\overline{D}_1$ is true. From the first five lines of FIGURE 5, it is seen that if the least significant bit of the 3-bit video code, i.e. $B_{11}$ is true or a "1." The counter is incremented by an odd number, either +1 or +3. Thus, if the least significant bit of the counter, i.e. $C_{11}$ is a zero, that is $\overline{C}_{11}$ is true, $C_{11}$ is updated to a "1" or a true state, by means of gates 72, 75, 73 and the output OR gate 76. On the other hand if $B_{11}$ is zero, i.e. $\overline{B}_{11}$ is true, and $C_{11}$ is true, then if either $B_{21}$ or $B_{31}$ is true, (gates 71 and 74) $C_{11}$ is updated to true. The updating of $C_{11}$ after the leading edge is detected, i.e., $A_1$ is true and before the trailing edge is detected, i.e. $\overline{F}_1$ is true is controlled by AND gate 77 and its preceding gates, as shown in FIGURE 7.

The updating of bit $C_{21}$ may be better understood by referring to FIGURE 5, Equation 2 and FIGURE 8. Therein the updating of $C_{21}$, before the leading edge is detected, i.e. when $\overline{A}_1$ and $\overline{D}_1$ are both true, is controlled by AND gate 81 and the preceding gates, while the updating of the bit after the leading edge is detected, i.e. when $A_1$ is true, is controlled by gate 82 and all the gates preceding it. The updating of $C_{31}$ may be better understood by referring to FIGURE 9 wherein gate 91 and the gates preceding it control the updating before the leading edge is detected, and gate 92 and the preceding gates control the updating after the detection of the leading edge.

The updating of $A_1$ is best explained in conjunction with FIGURE 10. From it, it is appreciated that $A_1$ is set to true by gate 101 when the output of either of gates 102 or 103 is true. Gate 102 is true when the leading edge signal is first detected, which occurs when $D_1$ first becomes true. On the other hand gate 103 is true as long as $A_1$ is true and the trailing edge signal $F_1$ is not true.

It should again be pointed out that the updating of the three bit counter for each range bin interval is a function of the multibit video code ($B_{11}$, $B_{21}$ and $B_{31}$) provided by the quantizer Q1 for the particular range bin interval. However, in the stacked beam radar system of the present invention, the detection of leading and trailing edges is preferably a function of the counts in the counters and the multibit video codes in two adjacent channels for a particular range bin interval. Herein, it is assumed that the leading and trailing edges are detected when threshold count of eight in one channel or a threshold count of six is exceeded in each of the two adjacent channels 1 and 2. In FIGURE 6, in addition to the read register of M1 and the 3-bit video code from Q1, the gates used to detect the leading and trailing edges are also supplied with the 3-bit video code of Q2, that is $B_{12}$, $B_{22}$ and $B_{32}$ and the action bit and 3-bit counter from M2, i.e. $A_2$, $C_{12}$, $C_{22}$ and $C_{32}$. Also, the outputs of gate $D_2$ and $F_2$ from L2 are supplied to the logic gates 22 and 24. $D_2$ and $F_2$ in L2 perform the identical function that $D_1$ and $F_1$ perform in L1.

The operation of gate $D_1$ and the leading edge logic gates 22 are schematically diagrammed in FIGURE 11 and their operation expressed by Equation 8. Briefly, AND gate 111 controls one of the inputs of $D_1$ depending on the bits in channel 1 only. That input becomes true only when $\overline{A}_1$ is true and the threshold count of eight is exceeded in channel 1. On the other hand, gate 112 controls the other input of $D_1$ to be true only when the action bits in both channels are zeros, i.e. $\overline{A}_1$ and $\overline{A}_2$ are true and threshold counts of six are exceeded in both channels 1 and 2. A true output of gate 113 indicates that the threshold count of six is exceeded in channel 1 while a true output of gate 114 indicates that the threshold count of six was exceeded in channel 2.

The operation of gate $F_1$, providing a true output when the trailing edge is detected may be better explained in conjunction with FIGURE 12. Therein, a true output is provided by gate 121 to one input of $F_1$ only when $A_1$ is true and when the count in channel 1 exceeds the threshold count of eight. Also, a true output is provided by gate 122 to $F_1$ when both $A_1$ and $A_2$ are true and a threshold count of six is exceeded in channel 1, as represented by a true output of gate 123 and a threshold count of six is also exceeded in channel 2, as indicated by a true output of gate 124.

It should be pointed out that the logic circuitry shown in FIGURES 7 through 12 is all included in control logic L1. Similar circuitry is included in each of the other control logic L2 through L$n$, so that in each channel the three bit counter read out for each range bin interval may be incremented as a function of the multibit video code from its respective quantizer. Also, each control logic includes circuitry as shown in FIGURES 11 and 12, to provide the leading and trailing edge signals as a function of the count in the channel, exceeding the selected threshold count, such as eight, or when the count in each of the two adjacent channels exceeds a second selected threshold count, such as six. It should be appreciated that the selected threshold counts are presented as exemplary rather than as a limitation on the invention. Also, it should be appreciated that more than two channels may be combined so that when a threshold count in each of them is exceeded, leading and trailing edges may be determined. It is the signals produced when such leading and trailing edges are determined which are used to accurately determine the target azimuth.

There has accordingly been shown and described herein a novel processing arrangement for automatically processing video returns from each range bin interval in a stacked beam radar system. The video returns from each radar bin interval for each beam are quantized in a separate reception channel into a multibit video code used to increment a three bit counter associated with the range bin interval. When the count in each channel exceeds a first threshold count (such as eight), or the count in each of two adjacent channel exceeds a second lower threshold count (such as six), leading and trailing edge signals are produced. From the latter signals the target azimuth is calculated.

It is appreciated that those familiar with the art may make modifications and/or substitute equivalents in the arrangement as shown without departing from the spirit of the invention. Therefore, all such modifications and/or equivalents are deemed to fall within the scope of the invention as claimed in the appended claims.

I claim:

1. In a stacked beam radar receiving system wherein each of a plurality of reflected radar pulses is received by a different radar receiver forming part of a different reception channel, the receiver being operable to develop video returns for each of a plurality of range intervals the improvement in each channel comprising:

a quantizer responsive to the video returns developed in the channel receiver for each range interval to provide a multibit code whose amplitude is a function of the peak of the video returns with respect to a preselected threshold level;

storing means for storing a multibit word for each of said plurality of range intervals;

first logic means for updating the word associated with each interval as a function of the amplitude of the multibit code provided by said quantizer for the interval;

second logic means for providing a first azimuth signal when for any range interval the words in storing means and the multibit codes from quantizers in X related channels are in any one of a first group of relationships; and third logic means for providing a second azimuth signal when, for any range interval, the words in storing means and the multibit codes from quantizers in related channels are in any one of a second group of relationships.

2. The improvement as recited in claim 1 wherein the word associated with each range interval includes $y-1$ bits forming a counter and a $y$th bit defining an action bit, said first logic means consisting of gates for incrementing and decrementing the count of the $y-1$ bit counter as a function of the amplitude of the multibit code from the quantizer of the channel in accordance with a first updating group of relationships when said action bit is in a first state and in accordance with a second updating group of relationships when said action bit is in a second binary state.

3. The improvement as recited in claim 2 wherein said quantizer provides a three bit code whose amplitude is a function of the peak of the video returns from each range interval exceeding RMS noise by preselected numbers of decibels.

4. The improvement as recited in claim 3 wherein said quantizer provides a three bit code of an amplitude of which zero, one, two, three or four when the peak video returns exceed RMS noise by less than about 2.8 db, is between 2.8 db and 5.8 db, between 5.8 db and 7.6 db, between 7.6 db and 9.0 db or at least 9 db above RMS noise, respectively, and said first logic means includes gates for decrementing the $y-1$ bit counter by one when said code is zero and the action bit is at a first state, and increment the count by one, two, three or four when the amplitude of the code is one, two, three or four respectively.

5. The improvement as recited in claim 4 wherein said first gating means further includes gates to increment the count of said $y-1$ bit counter by two, one and zero when the amplitude of the code is zero, one and two respectively and said action bit is in a second state, and decrement the count of the counter by one and two when the action bit is in said second state and the code amplitude is three and four respectively.

6. The improvement as recited in claim 5 wherein $y$ is four, said second logic means including gates to provide said first azimuth signal when said action bit is in said first state and the count in said three bit counter together with the amplitude code at least equal a threshold count of eight, said third logic means including gates to provide said second azimuth signal when said action bit is in said second state and the count in said three bit counter together with the amplitude code at least equal a threshold count of eight.

7. The improvement as recited in claim 6 wherein X is at least two, said second logic means further including gates for providing said first signal when the action bits in two adjacent channels are in said first state and a threshold count of six is at least equalled in each channel, said third logic means further including gates for providing said second signal when the action bits in two adjacent channels are in said second state and a threshold count of six is at least equalled in each channel.

8. In a radar receiving system, an automatic data processor responsive to video returns developed in said receiving system for each range interval in a plurality of range sweeps comprising:

a range counter for defining the range intervals during each range sweep;

quantizing means for each range sweep receiving the video returns from each range interval in said sweep for digitizing them into a multibit video code whose numerical value is a function of the peak of the video returns;

storing means for each range sweep for storing a multibit word for each range interval;

means for each range sweep for reading out from said storing means the multibit word associated with a range interval when said quantizing means provide the multibit video code representing the peak of the video returns from said interval; and logic means for updating the multibit word read out for each range interval as a function of the amplitude of the multibit video code representing the peak of the video returns therefrom.

9. The automatic data processor as recited in claim 8 wherein at least a part of the multibit word defines a multibit counter which is updated by direct proportion to the amplitude of the multibit video code from said quantizing means.

10. The automatic data processor as recited in claim 8 wherein said logic means includes a first group of gates for providing an azimuth leading edge signal when the states of the bits of a word associated with a range interval and the states of the bits comprising the video code therefrom, are in any one of a first group of relationships, said logic means further including a second group of gates for providing an azimuth trailing edge signal when the states of the bits of a word associated with a range interval and the states of the bits comprising the video code therefrom are in any one of a second group of predetermined relationships.

11. The automatic data processor as recited in claim 10 wherein said multibit word consists of $y$ bits, $y-1$ bits defining a counter and the $y$th bit an action bit, each of said bits having first and second states, said logic means including gates for updating the states of said $y-1$ bits in direct proportion to the numerical value of the multibit video code from said quantizing means when said action bit is in said first state, and for updating the states of said $y-1$ bits in a relationship with respect to the numerical value of the multibit video code when said action bit is in said second state.

12. The automatic data processor as recited in claim 11 wherein $y$ equals four, three of the bits defining a three bit counter and the multibit video code consists of three bits, whose states represent any one of the numerical values of zero, one, two, three and four, the count of said three bit counter being decremented by one in response to a video code of zero, and incremented by one, two, three and four respectively when the video code is one, two, three or four and the action bit is in said first state, said first group of gates providing said leading edge signal when the value of the video code and the count of the three bit counter exceed a threshold count of eight.

13. The automatic data processor as recited in claim 12 wherein the video code is zero, one, two, three or four as a function of the amplitude relationship of the peak video returns from each range interval with respect to RMS noise, represented by a preselected threshold level.

14. In a stacked beam radar receiving system of the type consisting of a plurality of reception channels, each channel including a receiver for receiving reflected signals from a different transmitted radar pulse from a succession of range intervals, the receiver developing video returns for the signals received from each range interval, the improvement in each reception channel comprising:

a quantizer converting the video returns from each range interval developed by the channel receiver into a multibit code the amplitude of which is related to the peak of the video returns;

a channel memory including a multibit storage word for each of the range interval which said channel receiver develops video returns, said word including a plurality of bits forming a binary counter;

first channel logic means responsive for each range interval to the multibit amplitude code representing the peak of the video returns therefrom and the bits in said storage word for updating the count in the counter as a function of the amplitude of said multibit code; and second channel logic means for providing a leading edge signal and a trailing edge signal when predetermined threshold counts are at least equalled in said channel.

15. The improvement as recited in claim 14 wherein said second channel logic means provide said leading edge signal and said trailing edge signal when preselected threshold counts are at least equalled in said channel and at least one adjacent reception channel.

16. In a stacked beam radar receiving system, the improvement comprising:
means for quantizing into a multibit code the video returns from each range bin;
counting means associated with each range bin in each reception channel;
means for supplying said codes to control the count of said counting means; and
control means for providing a first output signal for a range bin when the count in its respective counting means reaches a first selected count value.

17. The improvement as recited in claim 16 wherein said control means further provides said first output signal when the counting means in adjacent channels reaches a second selected count value.

18. The improvement as recited in claim 17 further including logic means included in said control means for resetting said counting means when said first and second count values are reached therein, and for providing a second output signal when either said first selected count value is reached in one of said counting means or said second selected count value is reached in two adjacent counting means.

19. A radar receiving system comprising:
receiving means for each of a plurality of reception channels for quantizing the video returns from each range bin into a multibit code;
counting means for each range bin in each channel;
means for controlling the count in each counting means as a function of the multibit code produced as a function of the video returns from the range bin; and
control means for providing a first output signal when the counting means, associated with any range bin reaches a first count value or when the counts in counting means in related channels reach a second count value.

20. The system as recited in claim 19 wherein said control means further includes logic means for resetting said counting means when said first output signal is produced and for providing a second output signal when the count in one of said counting means and in counting means in two adjacent channels reach said first and second count values, respectively.

References Cited

UNITED STATES PATENTS 3,286,258 11/1966 McQueen.
3,353,177 11/1967 Wilmot.

RODNEY D. BENNETT, *Primary Examiner.*

C. L. WHITHAM, *Assistant Examiner.*